(12) United States Patent
Inaoka et al.

(10) Patent No.: US 7,328,760 B2
(45) Date of Patent: Feb. 12, 2008

(54) SEMI TRACKED-TYPE WORKING VEHICLE (75) Inventors: Motonari Inaoka, Sakai (JP); Takeshi Imamura, Sakai (JP); Yuji Tomiyama, Sakai (JP); Takashi Kobayashi, Sakai (JP); Yoshikazu Aota, Sakai (JP)

(73) Assignee: Kubota Corporation, Osaka (JP)

( * ) Notice: Subject to any disclaimer, the term of this patent is extended or adjusted under 35 U.S.C. 154(b) by 104 days.

(21) Appl. No.: 10/488,646

(22) PCT Filed: Jun. 12, 2003

(86) PCT No.: PCT/JP03/07522

§ 371 (c)(1),
(2), (4) Date: Oct. 28, 2004

(87) PCT Pub. No.: WO03/106248

PCT Pub. Date: Dec. 24, 2003

(65) Prior Publication Data

US 2005/0060918 A1    Mar. 24, 2005

(30) Foreign Application Priority Data

Jun. 14, 2002  (JP)  ............................. 2002-175009
Jun. 14, 2002  (JP)  ............................. 2002-175010
Jun. 14, 2002  (JP)  ............................. 2002-175011

(51) Int. Cl.
*B62D 55/04*  (2006.01)

(52) U.S. Cl. .................. 180/9.21; 180/9.34; 180/9.38; 180/9.42

(58) Field of Classification Search ............... 180/9.21, 180/9.34, 9.38, 9.42
See application file for complete search history.

(56) References Cited

U.S. PATENT DOCUMENTS 2,057,211 A * 10/1936 Shere .......................... 180/9.38
2,310,775 A *  2/1943 Gavagnin ................... 180/9.46

(Continued)

FOREIGN PATENT DOCUMENTS

JP          60-131475          9/1985

(Continued)

*Primary Examiner*—Lesley D. Morris
*Assistant Examiner*—Marlon Arce-Diaz
(74) *Attorney, Agent, or Firm*—The Webb Law Firm (57) ABSTRACT

A semicrawler-type working vehicle is provided having a vehicle body (3), a front steering control wheel (7) arranged at a front side of the vehicle body, a drive shaft (26) and a pivot shaft (22) arranged at a rear side of the vehicle body, and a semicrawler unit (2) driven by the drive shaft. The semicrawler-type working vehicle comprises: a track frame (16) by which the semicrawler unit (2) is supported via the pivot shaft (22) so as to be pivotable relative to the vehicle body (3); a drive wheel (11) arranged on the drive shaft (26); a front driven wheel (12) and a rear driven wheel (13) that are supported by the track frame (16) such that a horizontal distance from the drive wheel (11) to the front driven wheel (12) is longer than a horizontal distance from the drive wheel (11) to the rear driven wheel (13); and a crawler belt (15) that is wound around the drive wheel (11), the front driven wheel (12), and the rear driven wheel (13). The pivot shaft (22) is displaced forward than a vertical line that runs through a center of the drive wheel (11).

12 Claims, 10 Drawing Sheets

U.S. PATENT DOCUMENTS

| | | | |
|---|---|---|---|
| 2,467,947 A * | 4/1949 | Skelton | 180/9.5 |
| 2,541,943 A * | 2/1951 | Sherman et al. | 180/9.38 |
| 5,273,126 A * | 12/1993 | Reed et al. | 180/9.21 |
| 5,358,064 A * | 10/1994 | Oertley | 180/9.5 |
| 6,164,399 A * | 12/2000 | Bays | 180/9.5 |
| 6,199,646 B1 * | 3/2001 | Tani et al. | 180/9.21 |
| 6,564,889 B1 * | 5/2003 | Yamazaki et al. | 180/9.54 |
| 6,655,482 B2 * | 12/2003 | Simmons | 180/9.1 |
| D497,621 S * | 10/2004 | Inaoka et al. | D15/28 |
| 6,890,042 B2 * | 5/2005 | Inaoka et al. | 305/173 |
| 2003/0116366 A1 * | 6/2003 | Simmons | 180/9.62 |

FOREIGN PATENT DOCUMENTS

| | | |
|---|---|---|
| JP | 4-505902 | 10/1992 |
| JP | 10-45051 | 2/1998 |
| JP | 11-31729 | 11/1999 |
| JP | 2000-142501 | 5/2000 |

* cited by examiner

SEMI TRACKED-TYPE WORKING VEHICLE

TECHNICAL FIELD

The present invention relates to a semicrawler-type working vehicle having a vehicle body, a front steering wheel arranged at a front position of the vehicle body, a drive shaft and a pivot shaft arranged at rear positions of the vehicle body, and a semicrawler unit driven by the drive shaft.

BACKGROUND ART

Conventional semicrawler-type working vehicles are known, for example, from Japanese Patent Application H11-321729 and U.S. Pat. No. 6,199,646 B1. Each working vehicle has a track frame that pivotably supporting a semicrawler unit relative to the vehicle body by means of a pivot shaft, a drive wheel arranged on a drive shaft, a front driven wheel and a rear driven wheel supported on the track frame such that a horizontal distance from the drive wheel to the front driven wheel is longer than a horizontal distance from the drive wheel to the rear driven wheel, and a crawler belt wound around the drive wheel, front driven wheel and rear driven wheel. The pivot shaft for pivotably supporting the track frame has its axis positioned on a vertical line that runs through an axis of the drive wheel. And, a tension is applied to the rubber crawler belt by causing a forward protruding movement of the front driven wheel with a tension adjusting mechanism.

In such a conventional semicrawler-type working vehicle, an amount of rearward protrusion of the semicrawler unit from the drive wheel is shortened to avoid an interference with any work machine that is mounted to the rear of the tractor, and an amount of forward protrusion of the semicrawler unit from the drive wheel is lengthened to increase a traction force by increasing a ground-contacting length of the crawler belt. This structural characteristic is retained for different field conditions such as wet fields (paddy fields) and dry fields.

Incidentally, in such a semicrawler-type working vehicle, when lifting the entire vehicle body including the front wheels and the semicrawler units without any tension being applied to the crawler belt, the track frame tends to assume a slight front-down tilted posture since it has the tension adjusting mechanism in its front portion. When a tension is applied to the crawler belt in this state, a centripetal force acting in an inward direction of the semicrawler unit is produced in the drive wheel and the front and rear driven wheels, since the crawler belt is being pulled circumferentially.

When the centripetal force affecting the drive wheel and the front and rear driven wheels is compensated, the resultant force becomes approximately zero and the track frame does not move. When the horizontal distance from the drive wheel to the front driven wheel and the horizontal distance from the drive wheel to the rear driven wheel are equal while in contact with the ground (forming an isosceles triangle in which the portion of the crawler belt in contact with the ground is the base), at the time when the track frame transitions from its natural, slight forward tilting posture to a horizontal posture, the forces acting on the drive wheel and the front and rear driven wheels compose directly below the axis of the drive wheel and the resultant force becomes substantially zero, thus resulting in a balanced state.

When the horizontal distance from the drive wheel to the front driven wheel is set longer than the horizontal distance from the drive wheel to the rear driven wheel while in contact with the ground, a larger torque is produced by the application of tension in the span from the drive wheel to the front driven wheel in comparison to that produced in the span from the drive wheel to the rear driven wheel, since the former span is longer. Then, in order to neutralize the resultant force, a posture alteration is made so that the slight front-down tilted posture of the track frame becomes horizontal and into a front-up posture (a slight rear-down tilted posture in which the front portion of the track frame is slight is raised).

And, although the track frames become substantially horizontal to the ground when the semicrawler units contact the ground while in this slight rear-down tilted posture, a front-raising force (prestress) is applied to the semicrawler units.

This front-raising force works as a floating direction force in soft ground areas such as wet fields (paddy fields) and has the function of preventing the semicrawler units from sinking. However, this results in reduced traction force when working on dry fields or the like.

An object of the present invention is to provide a working vehicle equipped with semicrawler units that are improved to better suit wet fields and dry fields.

DISCLOSURE OF INVENTION

In order to achieve the above-mentioned object, the present invention starts, as a starting point, from a semicrawler-type working vehicle having a vehicle body, a front steering control wheel arranged at a front position of the vehicle body, a drive shaft and a pivot shaft arranged at rear positions of the vehicle body, and a semicrawler unit driven by the drive shaft, the semicrawler-type working vehicle comprising: a track frame pivotably supporting the semicrawler unit relative to the vehicle body by means of the pivot shaft; a drive wheel arranged on the drive shaft; a front driven wheel and a rear driven wheel that are supported by the track frame such that a horizontal distance from the drive wheel to the front driven wheel is longer than a horizontal distance from the drive wheel to the rear driven wheel; and a crawler belt wound around the drive wheel, the front driven wheel and the rear driven wheel. According to the present invention, when a tension is applied to the crawler belt, the pivot shaft is actually displaced forward from a virtual position of the pivot shaft in which forces acting on the drive wheel and the front and rear driven wheels are in a substantially balanced state.

As another proposed solution, the pivot shaft is displaced forward from a vertical line that runs through a center of the drive wheel.

With the technology of these solutions, the front-wheel-raising force when the tension is applied to the crawler belt can be reduced in comparison to conventional semicrawler-type working vehicles and, when the extent of the displacement is increased, a downward force acts on the front wheel, thus improving a traction force in dry fields.

Of course, when special specifications are required such as when the front wheel needs floated up in wet fields, the pivot shaft can be displaced rearward from a vertical line that runs through a center of the drive wheel.

In one preferred embodiment of the present invention, the track frame may be pivotably supported relative to the pivot shaft and a position of the track frame is adjustable in a longitudinal direction of the vehicle, or the pivot shaft may be adapted to adjust a position thereof relative to the vehicle body in the longitudinal direction of the vehicle. Or, both of these features may be employed. In this way, a displacement of the pivot shaft relative to the drive wheel can be freely adjusted.

For example, in order to pivotably support the track frame so that its position relative to the pivot shaft may be adjustable in a longitudinal direction of the vehicle, a pivot shaft bearing member for pivotably receiving the pivot shaft may be provided, the pivot shaft bearing member being adapted to adjust a position thereof in the longitudinal direction relative to the track frame.

In a further preferred embodiment of the present invention, a guide wheel may be arranged on the track frame to regulate a lateral displacement of the crawler belt between the drive wheel and the front driven wheel. Then, a lateral displacement in a loose side of the crawler belt between the drive wheel and front driven wheel may be regulated.

In a still further preferred embodiment of the present invention, a plurality of rollers are positioned between the front driven wheel and the drive wheel, and ground-contacting lugs are provided on the crawler belt. a pitch between adjacent rollers is longer than a pitch of adjacent ground-contacting lugs by 1/N (where N is the number of the rollers). Then, multiple rollers simultaneously falling between the ground-contacting lugs is reduced, thus reducing vertical oscillation of the vehicle body.

In order to reduce vertical oscillation of the vehicle body, crawler belt wear, and dirt adhesion to the rollers and the front and rear driven wheels, the outer perimeter of each of the rollers positioned between the front driven wheel and the drive wheel may be covered with rubber.

In a yet still further preferred embodiment of the present invention, the pivot shaft may include two short shafts aligned on a same axis. Then, the track frame may be supported relative to the vehicle body over a wider lateral range, and support of the track frame is strengthened.

By using the technological concept of the present invention, when using a semicrawler-type working vehicle in a dry field, it is possible to displace the pivot shaft forward from a virtual pivot point of the track frame in which forces acting on the drive wheel and the front and rear driven wheels when tension is applied to the crawler belt are substantially balanced, and thus possible to apply a downward force to the front portion of the travel device when crawler tension is applied, and when using the vehicle in a wet field, it is possible to displace the pivot shaft rearward from the virtual pivot point and to apply a raising or lowering force to the front portion of the travel device when crawler tension is applied. In this way, it is possible to apply a raising/lowering force to the front portion of the travel device when tension is applied to the crawler belt, thus achieving functionality suitable to field conditions such as securing a traction force in dry fields, a floating force and so on in wet fields.

BEST MODE FOR EMBODYING THE INVENTION

Figure 1:
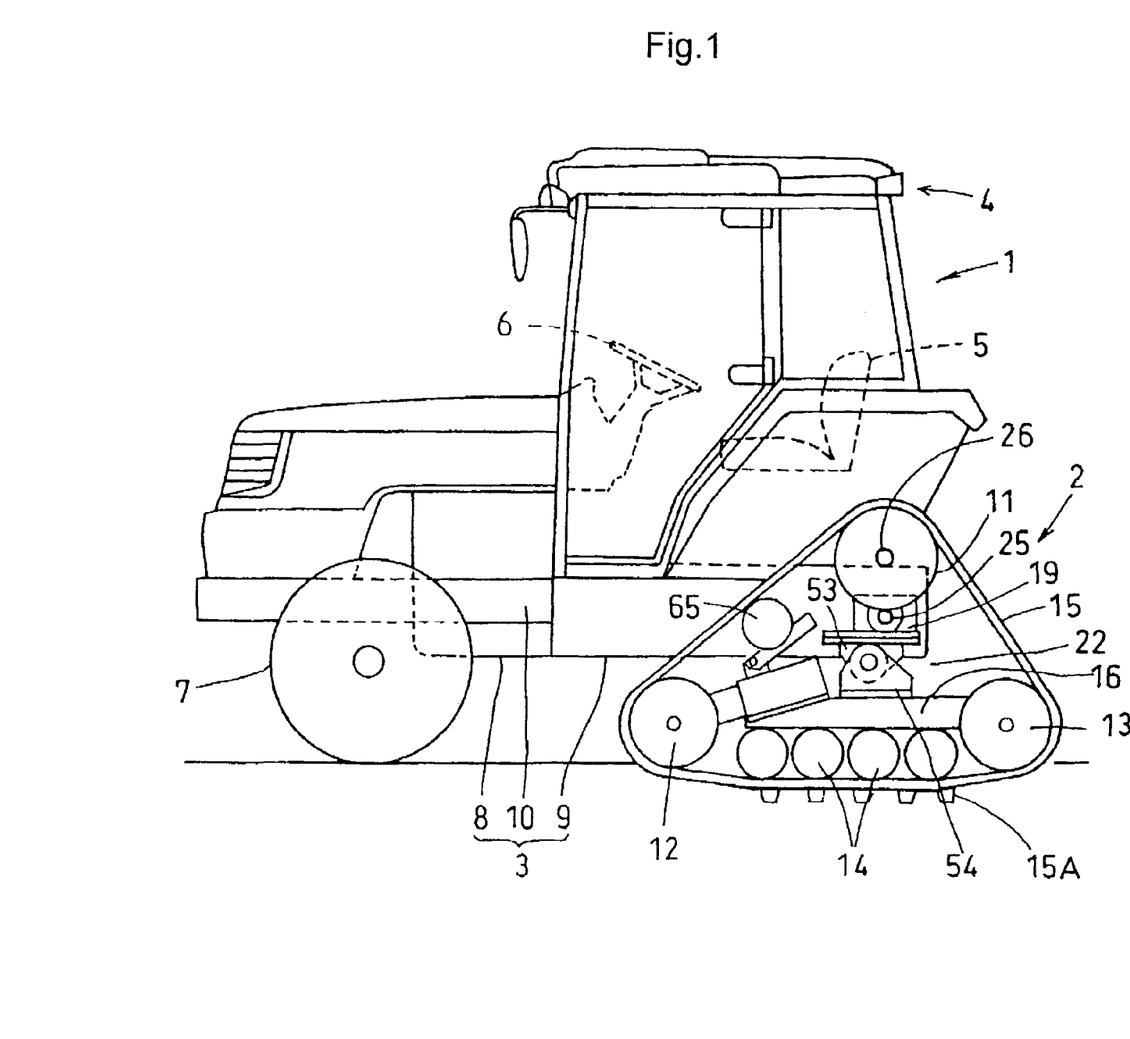
FIG. 1 shows an entire side view of a tractor according to an embodiment of the present invention.

In FIG. 1, numeral 1 denotes a semicrawler-type tractor including independent right and left semicrawler units 2, instead of two rear wheels of a four-wheel drive tractor. Its front wheels 7 are steering control wheels.

A cabin-equipped tractor mounting a cabin 4 at a rear portion of a vehicle body 3 is shown as one example of such a tractor 1. A driver's seat 5 is arranged inside a rear portion of the cabin 4, and a steering wheel 6 is positioned in front of the driver's seat 5.

A transmission case 9 is attached to the vehicle body 3 through a flywheel housing at a rear portion of an engine 8. A front axle frame 10 protrudes forward from the engine 8. At the rearward, right and left sides of the transmission case 9, rear axle cases 19 (axle cases) are protruding outward to the right and left.

Figure 2:
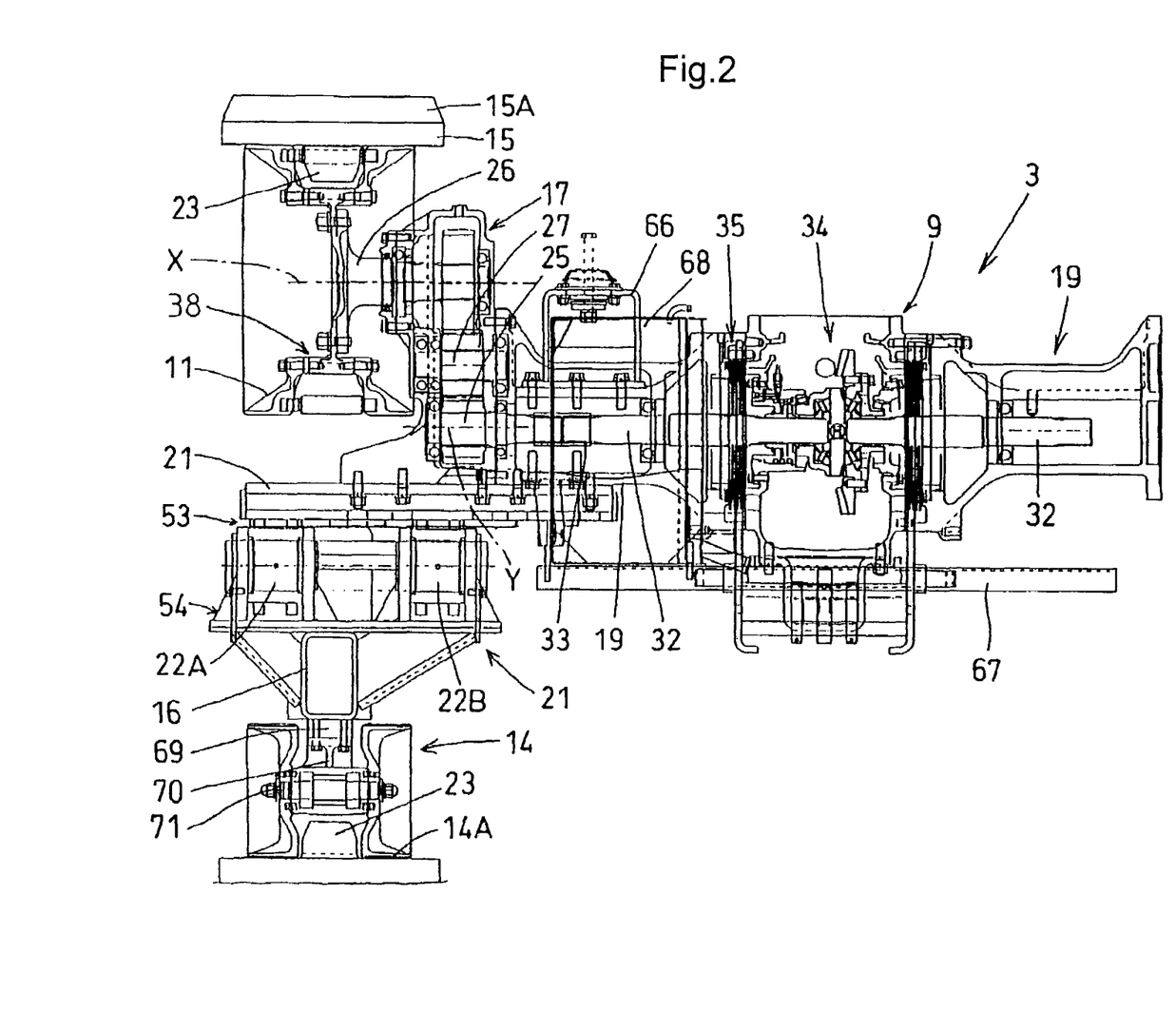
FIG. 2 is a cross sectional rear view of a tractor rear portion.

The pair of the semicrawler units 2 are constructed symmetric on the right and left, and after each is assembled as a unit, these units are detachably mounted at outer ends of the respective rear axle cases 19 as shown in FIG. 2.

In FIGS. 1 through 9, each of the right and left semicrawler unit 2 includes a drive wheel 11; a pair, front and rear, of driven wheels 12, 13; a plurality of rollers 14 (four in this embodiment); a crawler belt 15 wound around the drive wheel 11 driven wheels 12, 13 and rollers 14; a track frame 16; and a drive transmission case 17 (a gear case). The crawler belt 15 is rotated circumferentially by rotating the drive wheel 11 around a transversal axis, thus enabling the tractor to travel.

Figure 3:
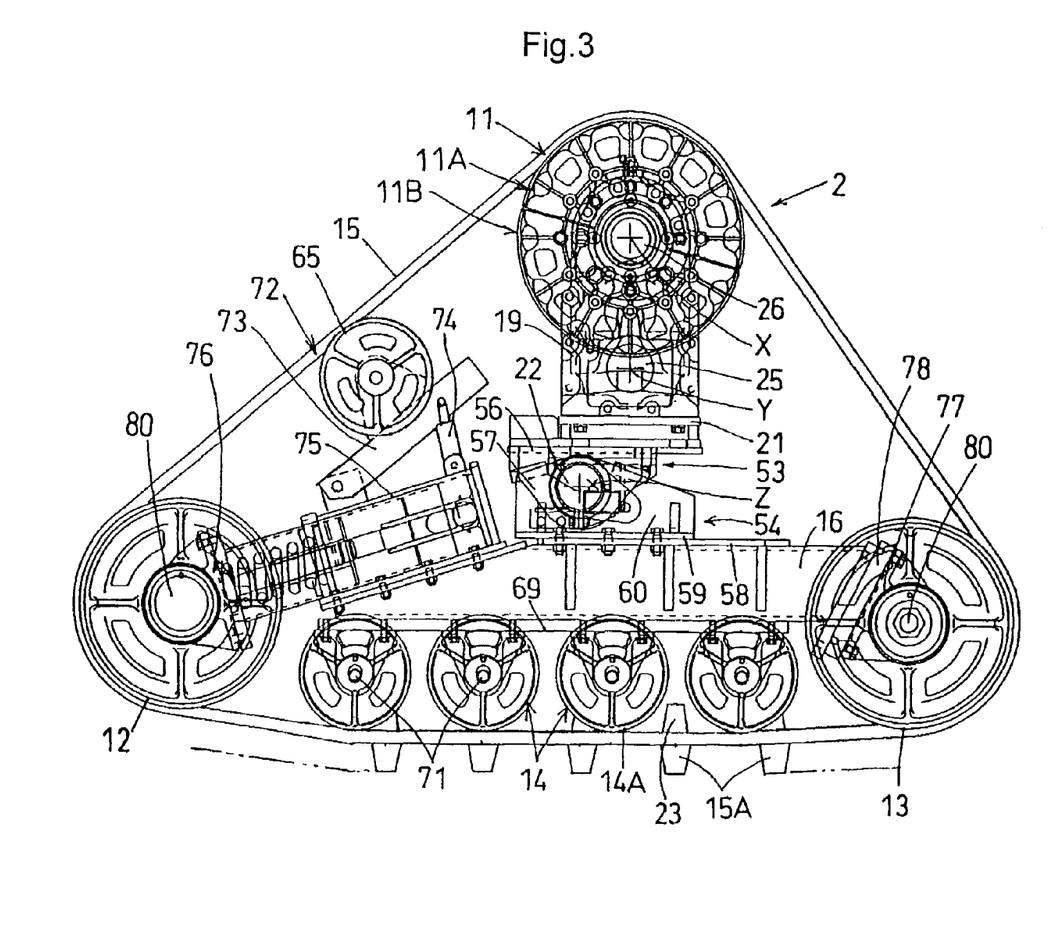
FIG. 3 is a side view of a semicrawler unit.
Figure 4:
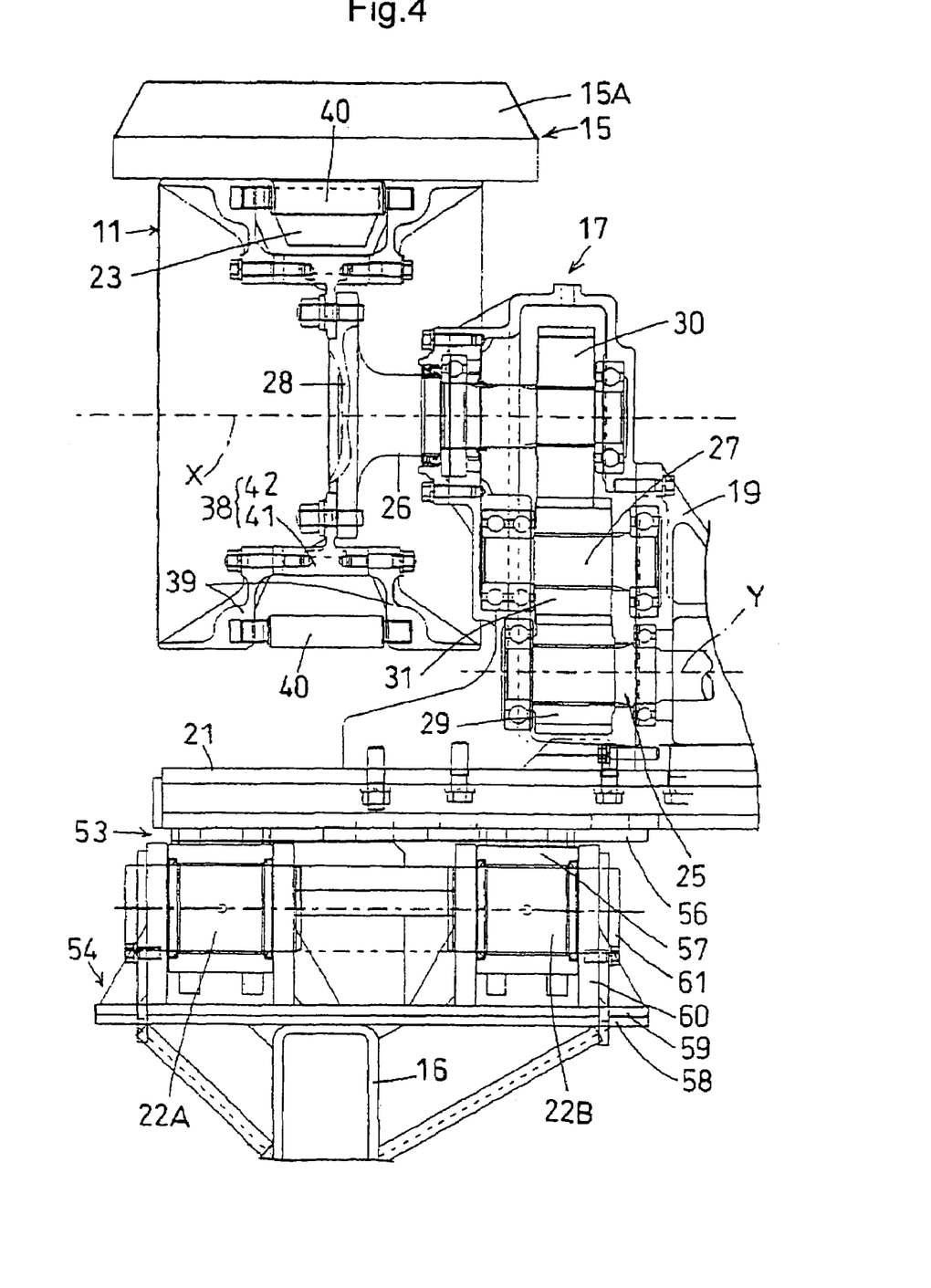
FIG. 4 is a cross sectional rear view of an upper portion of the semicrawler unit.

It should be noted that, in FIGS. 2, 3, and 4, various components directly appearing in each drawing are illustrated as transparent structures showing respective contours only so that as many components of the semicrawler unit 2 hidden by these components can be readily recognized as possible. This is also true to FIGS. 7 and 8.

The track frame 16 is mainly constituted by a four-sided tubular member extending longitudinally. The front and rear driven wheels 12, 13 are positioned at front and rear end portions of the track frame 16. The four rollers 14 are fitted at longitudinal intervals at midway positions of the track frame 16 so that these rollers 14 are readily attachable and detachable from below.

The drive wheel 11 is positioned above the track frame 16 and above a midway area between the front and rear driven wheels 12, 13. A drive shaft 26 mounting the drive wheel 11 is supported by the drive transmission case 17. The drive transmission case 17 is fixed to the respective outer, right/left ends of the rear axle case 19 located at the rear portion of the vehicle body 3.

An attachment member 21 having a larger width in the longitudinal direction than the drive transmission case 17 and the rear axle case 19 is arranged below the drive transmission case 17 and rear axle case 19. A pivot shaft 22 is supported by the attachment member 21 to be rotatable around a transversal axis. The track frame 16 is attached to the pivot shaft 22. With the front and rear driven wheels 12, 13 and the rollers 14 mounted, the track frame 16 is pivotally supported around an axis of the pivot shaft 22.

The crawler belt 15 has its main body portion formed into an endless belt with an elastic material such as rubber. Within the main body portion, anti-tension members may be embedded in its circumferential direction, and further anti-tension members (such as cored bars) may also be embedded in its width. Integral with the main body portion having identical intervals in its circumferential direction, drive protrusions 23 are provided on its inner side, and ground-contacting lugs 15A on its outer, ground-contacting side.

The drive protrusions 23 of the crawler belt 15 circumferentially engages the drive wheel 11 to receive a driving force from the drive wheel 11, and laterally engages the rollers 14, drive wheel 11 and driven wheels 12, 13 to prevent a wheel disengagement (prevent the crawler belt 15 from coming off).

Figure 8:
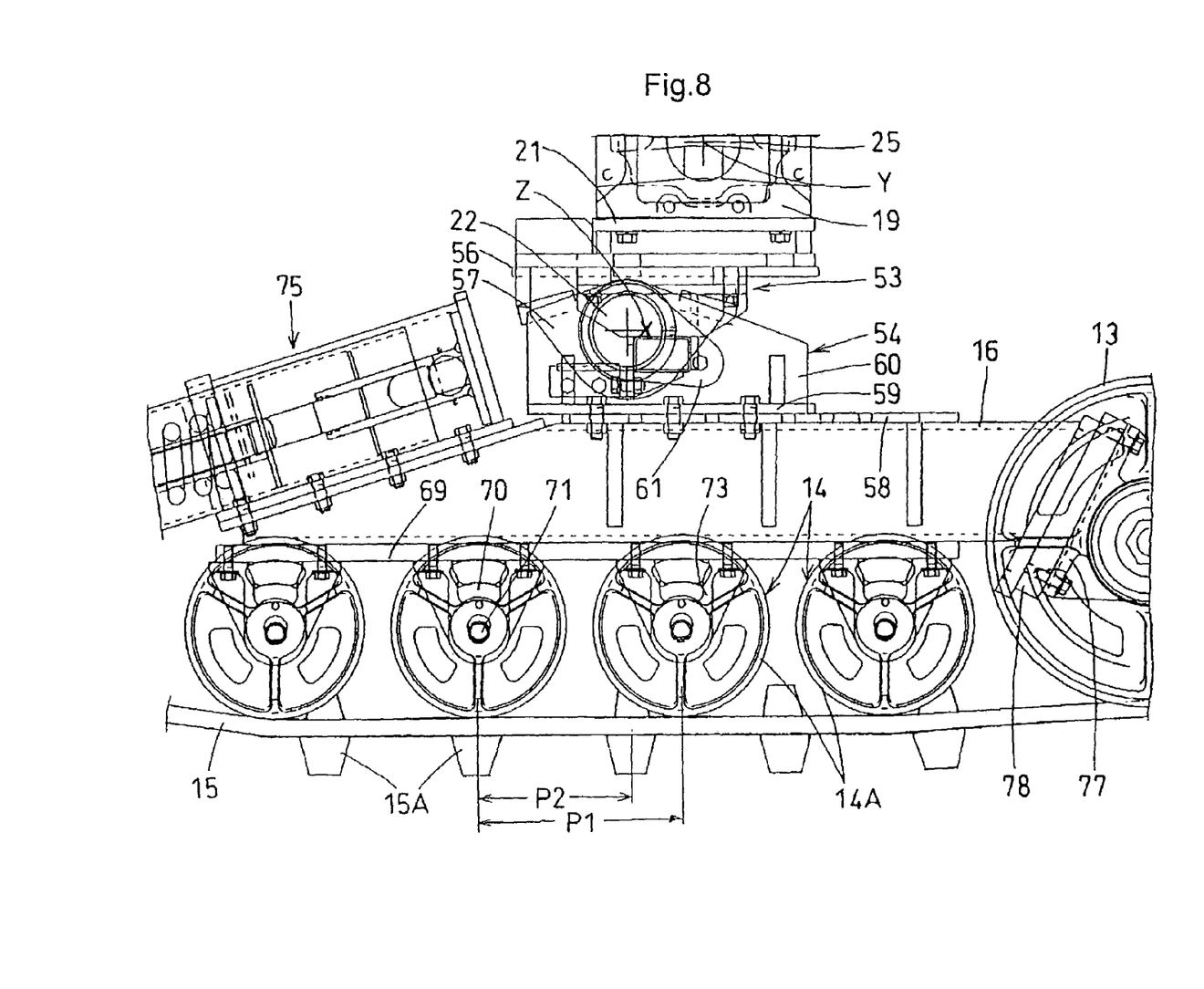
FIG. 8 is a lateral view of a lower portion of the semicrawler unit.

In FIGS. 1 and 8, the ground-contacting lugs 15A are positioned substantially corresponding to the drive protrusions 23. Each ground-contacting lug 15A has a straight shape across a width of the crawler belt 15 or an inclined shape inclined relative to the width direction of the crawler belt 15. The maximum load position of the ground-contacting lug 15A where each roller 14 is placed and applies a load thereto is constant in the width direction of the crawler belt 15. A pitch P2 of adjacent ground-contacting lugs 15A is shorter than a pitch P1 of adjacent rollers 14.

The plurality of rollers 14 are positioned so that its pitch P1 between adjacent rollers 14 is longer than a pitch P2 between adjacent ground-contacting lugs 15A of the crawler belt 15 by approximately a fraction of one over the number of rollers. That is, when there are four rollers 14, the pitch P1 is approximately 1.25 times the pitch P2. When one of the rollers 14 is directly above one of the ground-contacting lugs 15A, none of the other rollers 14 is on a ground-contacting lug 15A, but after moving a distance approximately one-quarter of the pitch P2, subsequent roller 14 reaches a position directly above the ground-contacting lug 15A. Although four rollers 14 do not fall between the ground-contacting lugs 15A at one time, one of the rollers 14 rides on one of the ground-contacting lugs 15A.

In FIG. 2, the numeral 66 denotes a support that supports a rear portion of the cabin 4 on the rear axle case 19, and the numeral 67 denotes a mount fixed to a bottom of the transmission case 9. The mount 67 extends beyond the transmission case 9 right and left, to mount a fuel tank 68 thereon.

As shown in FIGS. 2 and 4, a rear axle 25 (axle) extends laterally at a lower portion in the drive transmission case 17, and the drive shaft 26 extends parallel to the rear axle 25 at an upper portion in the drive transmission case 17. An intermediate shaft 27 extends between and parallel to the rear axle 25 and drive shaft 26. The rear axle 25 extends laterally inward from the drive transmission case 17, and is coupled via a coupling 33 with a driving shaft 32 inside the rear axle case 19.

The driving force from the engine 8 is transmitted to a rear wheel differential device 34 through a change speed mechanism inside the transmission case 9 via a clutch, and then branched to the driving shaft 32 inside each of the right and left rear axle cases 19, so that the driving force is transmitted from each driving shaft 32 to its corresponding rear axle 25. Numeral 35 denotes a braking device for braking the driving shaft 32.

The drive transmission case 17 is arranged at the outer end of the rear axle case 19. An outer end of the rear axle 25 is inserted into the drive transmission case 17. The intermediate shaft 27 and drive shaft 26 are supported by the drive transmission case 17. An end of the drive shaft 26 is protruded laterally outward. The drive wheel 11 is detachably fixed to a flange portion 28 on the protruding end of the drive shaft 26.

A first gear 29 mounted on the rear axle 25 engages with a second gear 30 on the drive shaft 26 via a driven wheel gear 31 on the intermediate shaft 27. The driving force is transmitted from the rear axle 25 to the drive shaft 26 by a gear transmission mechanism (a driving force transmission mechanism) including the gears 29, 30 and 31, thereby to rotate the drive wheel 11.

The drive shaft 26 is positioned above the rear axle 25 in a vertical direction. A rotational axis X of the drive wheel 11 is located above an axis Y of the rear axle 25, which allows a larger contact angle (a larger contact area) of the drive wheel 11 with the crawler belt 15, compared with the case where the rotational axis X of the drive wheel 11 were located on the rear axle 25. This too increases a rate of engagement between the drive wheel 11 and the drive protrusions 23 of the crawler belt 15, as well as the number of meshed teeth. In other words, this increases the number of mesh members 40 (mesh portions) for engaging the drive protrusions 23 of the drive wheel 11 in the area where the crawler belt 15 is wound around the drive wheel 11.

This reduces a load applied to the drive protrusions 23 from the mesh members 40 of the drive wheel 11, thus extending the life of the crawler belt 15 and better allows acceleration of the same. Twelve (12) mesh members 40 are arranged in the present embodiment, four of which mesh with the drive protrusions 23 at one time.

Figure 5:
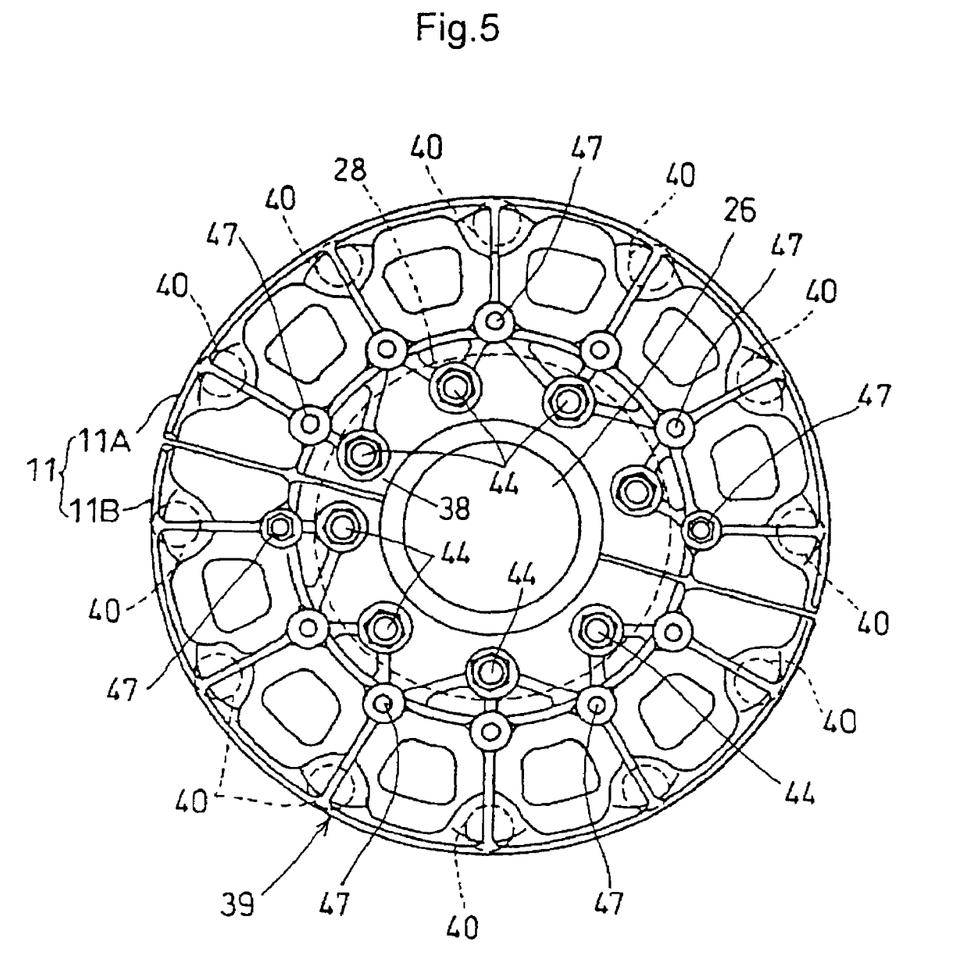
FIG. 5 is a side view of a drive wheel.
Figure 6:
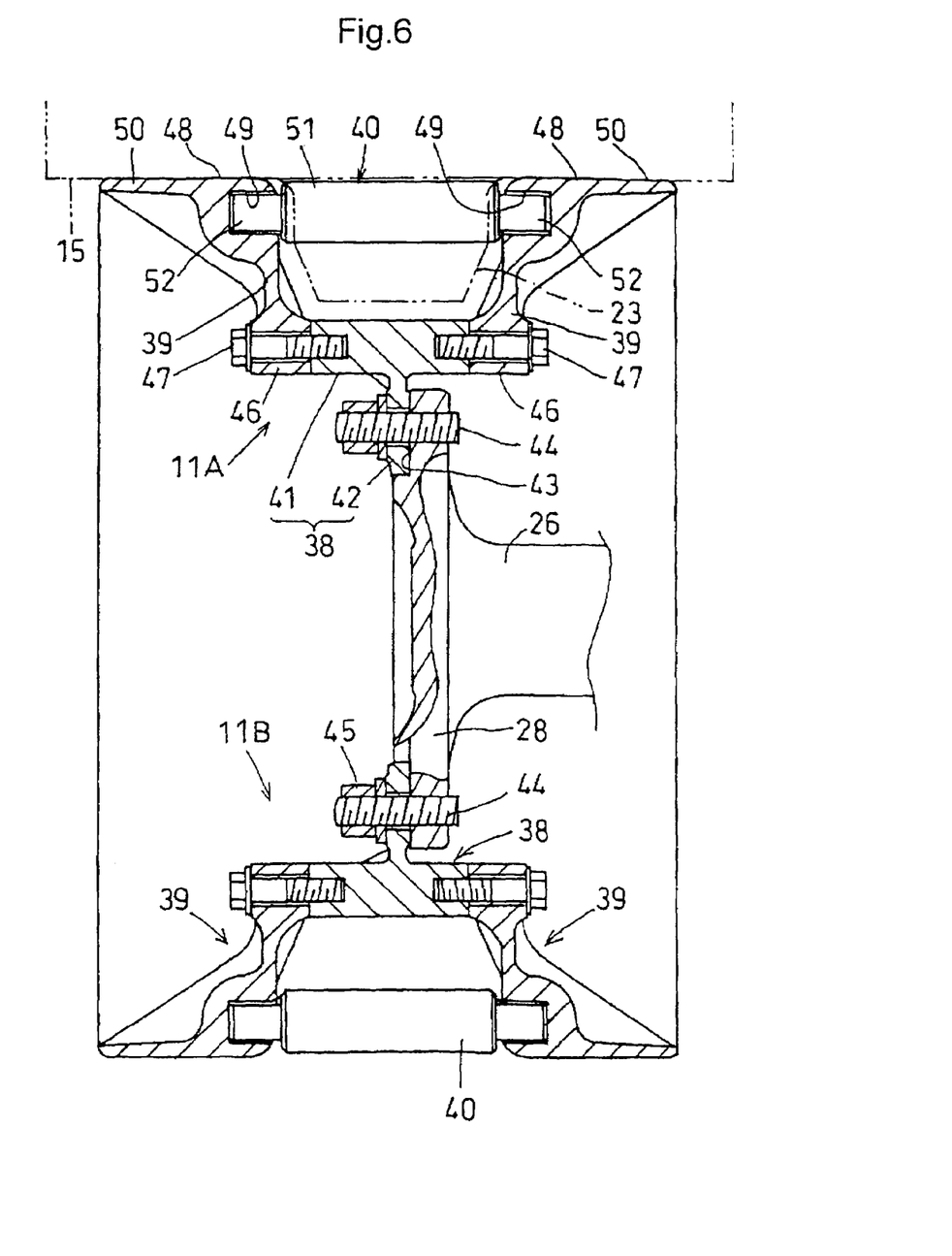
FIG. 6 is a cross sectional front view of the drive wheel.

As shown in FIGS. 5 and 6, the drive wheel 11 includes a ring-shaped attachment wheel 38 fixedly attached to the flange portion 28 of the drive shaft 26, ring-shaped side wheels 39 positioned right and left of the attachment wheel 38, and the mesh members 40 that mesh with the drive protrusions 23 of the crawler belt 15. The attachment wheel 38 and the right and left side wheels 39 are divided into multiple portions (two portions in the illustrated embodiment) in the circumferential direction.

When replacing the crawler belt 15, one drive wheel component 11A of the drive wheel 11 is positioned on top and the other drive wheel component 11B at the bottom. Subsequently, the lower drive wheel component 11B is removed, and then the upper drive wheel component 11A is rotated downward, which relaxes the tension on the crawler belt 15 to allow replacement of the same.

The attachment wheel 38 includes a cylindrical portion 41 concentric with the rotation axis X of the drive wheel 11, and an attachment flange 42 protruding radial-inwardly from an inner surface of the cylindrical portion 41.

On the other hand, attachment seats 43 are formed on an outer periphery of lateral outer surfaces of the flange portion 28 of the drive shaft 26, and the attachment flange 42 of the attachment wheel 38 is overlapped with the attachment seats 43. Then, the attachment wheel 38 is detachably fixed to the drive shaft 26 by means of stud bolts 44 screwed into respective screw holes passing through the attachment flange 42 and formed in the flange portion 28, and nuts 45 screwed onto the respective stand bolts 44.

An inner peripheral portion 46 each of the lateral wheels 39 abuts against a side surface of the cylindrical portion 41 of the attachment wheel 38, and the right and left lateral wheels 39 are detachably fixed to the attachment wheels 38 by attachment bolts 47 passing through the inner peripheral portion 46 and screwed into the cylindrical portion 41.

Outer peripheral portions 48 of the right and left lateral wheels 39 protrude radial-outwardly of the attachment wheels 38, and shaft support apertures 49 are formed at intervals in a circumferential direction on opposing faces of the outer peripheral portions 48 of the right and left lateral wheels 39.

And, on the outer peripheral portions 48 of the right and left lateral wheels 39, flange portions 50 extend outwardly right and left (in opposite sides) to come into contact with the inner circumferential surface of the crawler belt 15.

Each of the engaging members 40 comprises a pin and includes a columnar large-diameter engaging portion 51 in the middle in its axial direction, and small-diameter shaft portions 52 extending outward from the right and left sides of the engaging portion 51. The right and left shaft portions 52 are detachably inserted into corresponding shaft support apertures 49 of the lateral wheels 39.

The drive wheel 11 is segmented circumferentially, which facilitates, when replacing the engaging members 40, removal of the components of the lateral wheels 39 on the side where the crawler belt 15 is not wound (lower side).

Furthermore, bushings are fit onto the shaft portions 52 and shims are placed into the deep end of the shaft support apertures 49 so that the mesh members 40 are rotatably supported around a lateral axis. This reduces a wear caused by contact with the drive protrusions 23 and also prevents a local wear.

In FIGS. 2, 4, 7, and 8, the pivot shaft 22 includes concentric short shafts 22A and 22B separated into two, right and left parts with a gap in between. A pivot shaft suspension support member 53 suspending and supporting the pivot shaft 22 includes a mounting structure 56 fixedly bolted to a bottom surface of the attachment member 21, and a pair of, right and left cylindrical bearing members (bearing portions) 57 fixed to a bottom surface of the mounting structure 56.

Numerous bolt apertures are defined in at least one of the mounting structure 56 and attachment member 21 in a longitudinal direction thereof, so that a longitudinal attaching position of the mounting structure 56 is adjustable relative to the attachment member 21. That is, the pivot shaft suspension support member 53 is attached so that its longitudinal position is adjustable relative to the attachment member 21, and that a longitudinal position of the pivot shaft 22 is adjustable relative to the drive wheel 11 and rear axle case 19. This also means that a longitudinal position of the track frame 16 becomes adjustable relative to the drive wheel 11.

Figure 7:
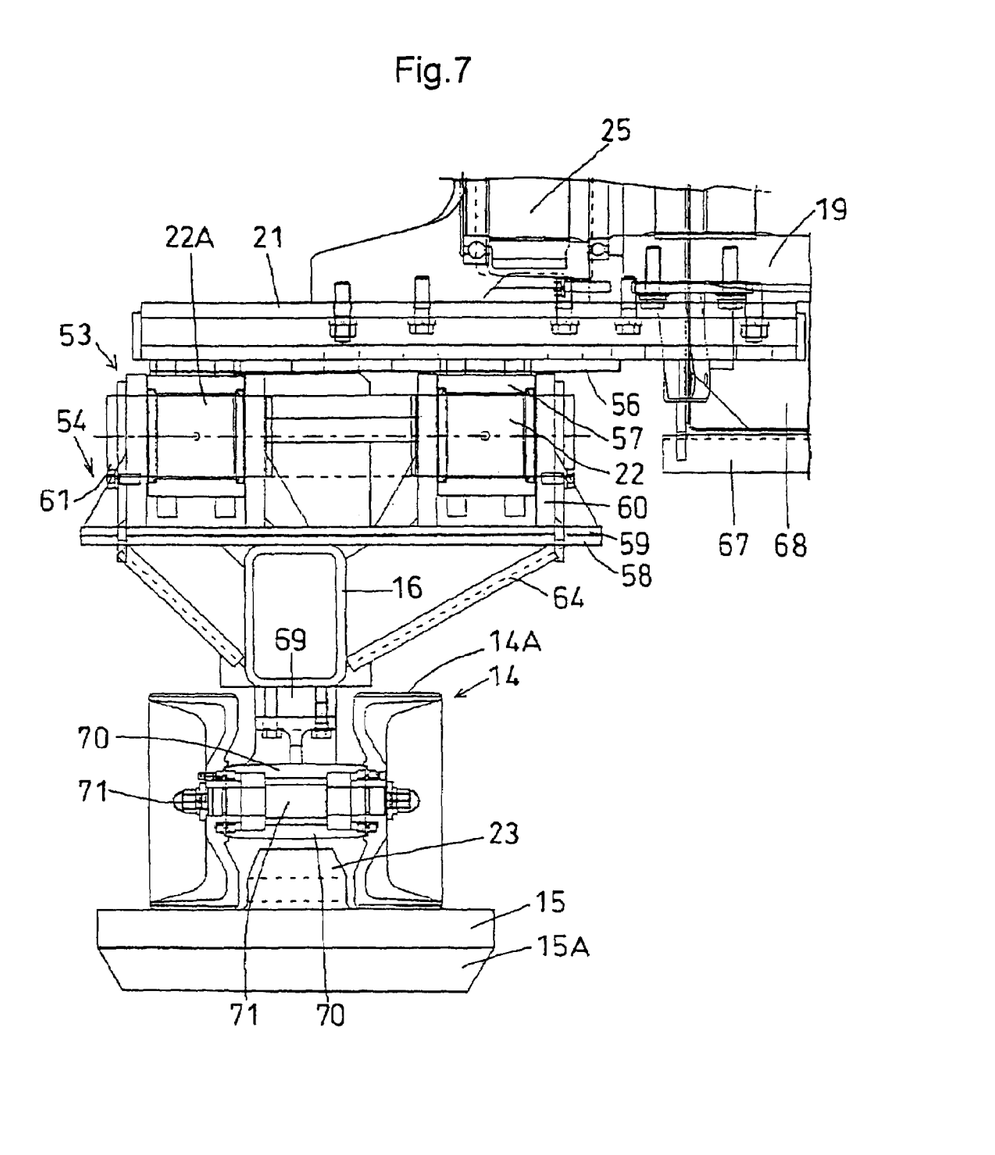
FIG. 7 is a cross sectional rear view of a lower portion of the semicrawler unit.

A support plate 58 is fixedly attached to a top middle surface of the track frame 16, and a pivot shaft bearing member 54 is mounted on the support plate 58. The pivot shaft bearing member 54 includes a receiving plate 59 mounted and bolt-fixed to the support plate 58, and a pair of, right and left bifurcated receiver bearing members 60 fixed on the receiving plate 59.

The bifurcated receiver bearing members 60 are fitted onto and supported by opposed ends of the short shafts 22A and 22B. Relative rotation of each bifurcated receiver bearing member 60 is inhibited by screwing a rotation stopper plate 61, which is fixed to the end portions of the short shafts 22A and 22B, onto the receiver bearing members 60.

The suspended bearing members 57 are positioned between the respective bifurcated receiver bearing members 60 and fitted thereon to be rotatable relative to the short shaft 22A/22B. Instead, the suspended bearing members 57 may be formed bifurcated and the receiver bearing members 60 may be formed cylindrical.

The pair of, right and left short shafts 22A and 22B are divided into right and left with respect to the center of the track frame 16, with the short shaft 22A on the outer side set in a position that does not protrude outwardly of the crawler belt 15.

At least one of the support plate 58 and receiving plate 59 has numerous bolt apertures defined in the longitudinal direction, and the receiving plate 59 is attached so that its longitudinal position is adjustable relative to the support plate 58. That is, the pivot shaft bearing member 54 is attached so that its longitudinal position is adjustable relative to the support plate 58, and the pivot shaft 22 is set so that its longitudinal position is adjustable relative to the track frame 16. Furthermore, this also results in the track frame 16 being set so that its longitudinal position is adjustable relative to the drive wheel 11.

The pivot shaft support member 53 and pivot shaft bearing member 54 are linked via the pivot shaft 22. When adjusting the position of the pivot shaft support member 53 relative to the rear axle case 19 and the position of the pivot shaft bearing member 54 relative to the track frame 16 by the same distance in identical direction, a longitudinal position of the pivot shaft 22 is adjusted while maintaining the longitudinal positional relationship of the drive wheel 11 relative to the front and rear driven wheels 12, 13.

An attachment plate 69 for attaching the rollers 14 is fixed by welding or the like to an underside of the track frame 16. The attachment plate 69 has its underside screw holes defined, with bearing members 70 detachably bolted from under. Each of the bearing members 70 includes a cylindrical portion having its axis extending laterally. A support shaft 71 is supported in the cylindrical portion via a bearing. The rollers 14 are mounted on the respective support shafts 71.

Since the rotation axis X of the drive wheel 11 is positioned higher than the axis Y of the rear axle 25, a large space can be obtained below the drive wheel 11. This secures a large space underneath the track frame 16 sufficient to attach from the underside of the bottom surface of the track frame 16, the roller unit including the rollers 14, the bearing members 70, and so on. Detachably fixing the roller unit to the underside of the track frame 16 secures an attachment-strength of the rollers 14.

The front driven wheel 12 is rotatably supported around a lateral axis onto a bracket 76 disposed on a tension adjusting device 75 for adjusting a tension acting on the crawler belt 15. The tension adjusting device 75 is fixed to a front portion of the track frame 16.

The rear driven wheel 12 is rotatably supported around a lateral axis onto a bracket 77 fixed to a rear end side of the track frame 16. A spacer 78 is arranged between the rear end of the track frame 16 and the bracket 77, to adjust, for example, a height and a longitudinal position of the rear driven wheel 12.

A guiding device 72 is arranged above the tension adjusting device 75. The guiding device 72 includes a pivoting arm 73 is pivotably supported on an outer surface of the tension adjusting device 75, a guide wheel 65 rotatably supported on the pivoting arm 73, and a biasing device 74 such as a compression spring arranged between the tension adjusting device 75 the pivoting arm 73. The guide wheel 65 is biased by the biasing device 74 in the direction to apply a tension to the crawler belt 15, and regulates a lateral position of the crawler belt 15 by sandwiching the drive protrusions 23 from right and left.

Figure 9:
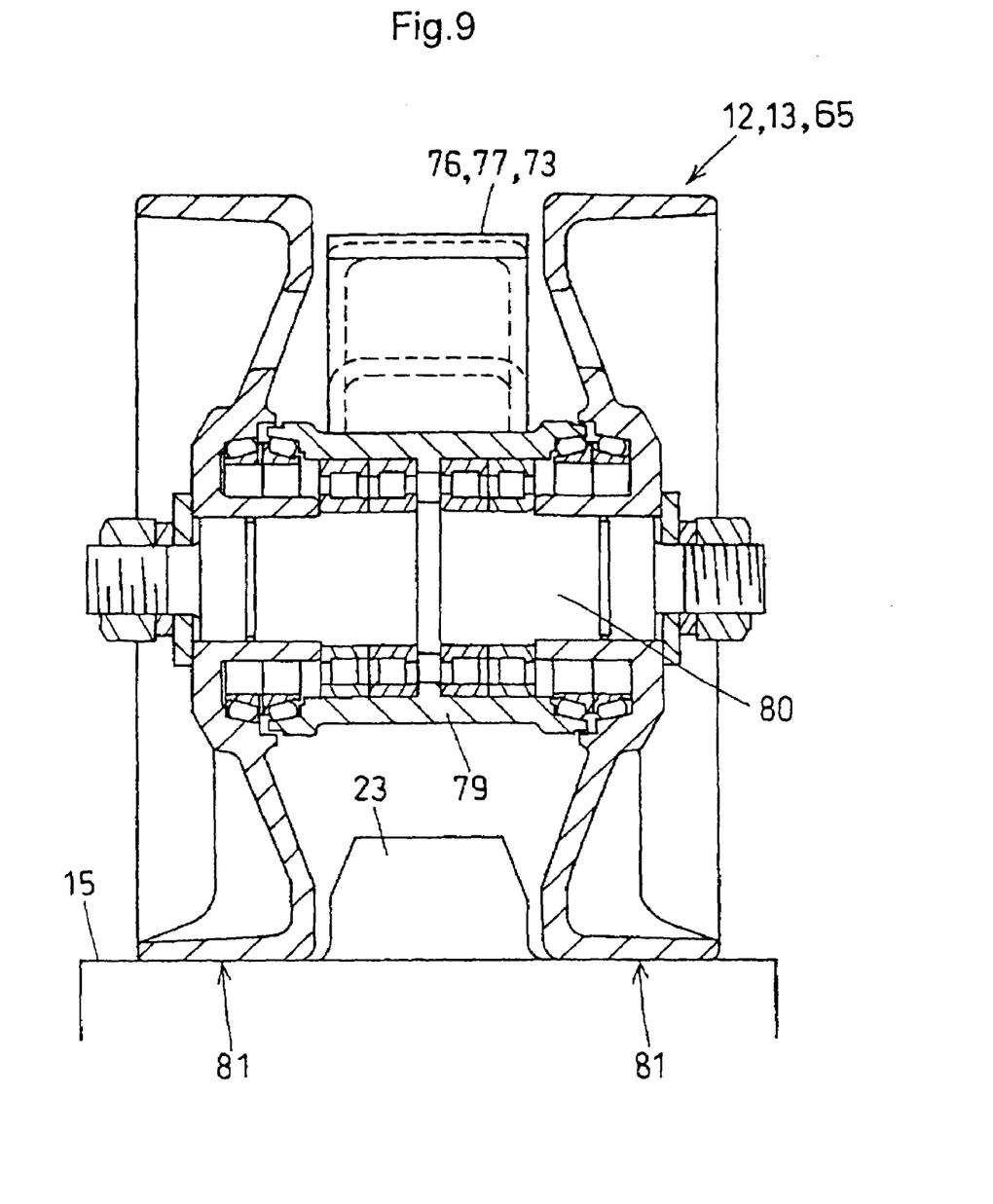
FIG. 9 is a cross section of a driven wheel and a guide wheel.

The front and rear driven wheels 12, 13 and the guide wheel 65 are arranged as shown in FIG. 9. That is, a spindle 80 is rotatably supported by a cylindrical portion 79 formed by the brackets 76, 77, 73. Then, a pair of, right and left wheel members 81 constituting the wheels 12, 13, and 65 are fixed onto opposed ends of the spindle 80. The right and left wheel members 81 are positioned on the right and left sides of the drive protrusions 23, respectively, to roll along the inner peripheral surface of the crawler belt 15.

The spacing between the right and left wheel members 81 of the guide wheel 65 is narrower than that of the front/rear driven wheel 12/13, thus preventing lateral displacement of the crawler belt 15. A diameter of the guide wheel 65 may be set the same as that of the front/rear driven wheel 12/13, or different instead. The outer perimeter of the guide wheel 65 may be covered with rubber in the same manner as the rollers 14.

Figure 10:
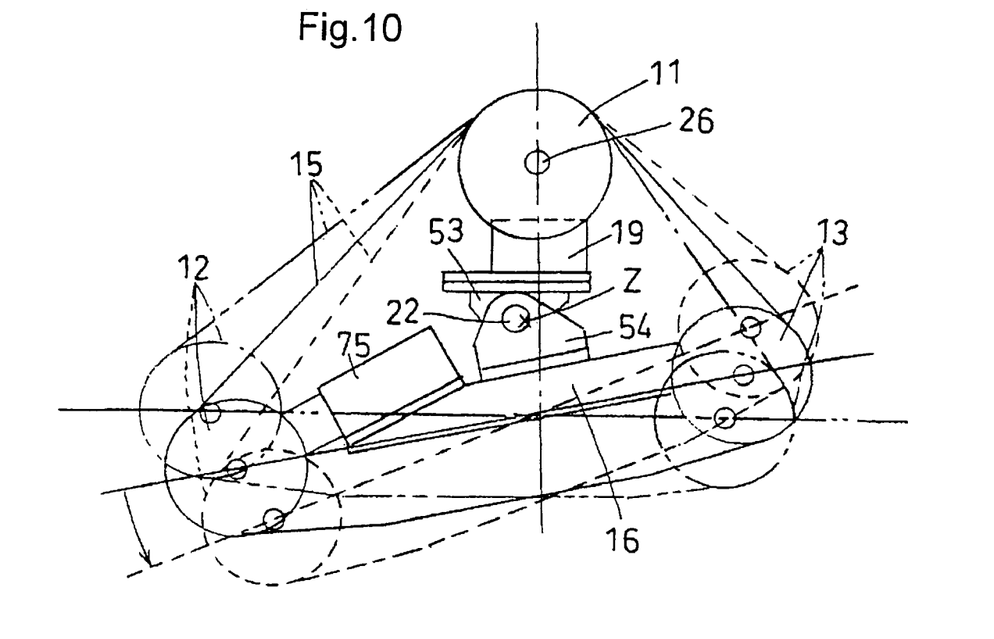
FIG. 10 is an explanatory view showing a lowering action on the semicrawler unit.
Figure 11:
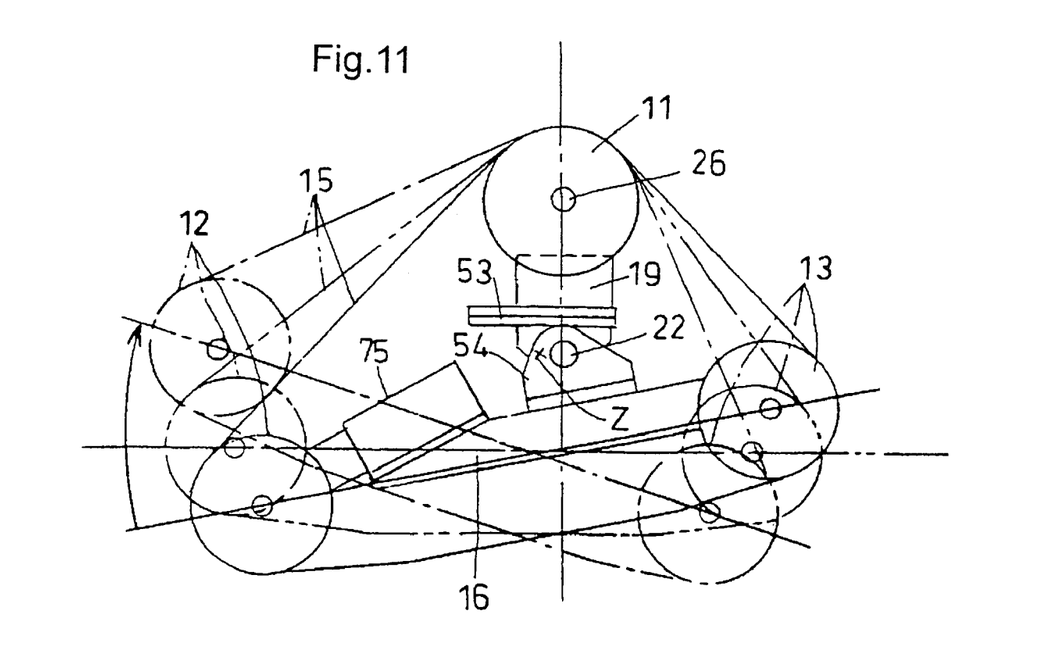
FIG. 11 is an explanatory view showing a raising action on the semicrawler unit.

With reference to FIGS. 10 and 11, in the semicrawler unit 2, the crawler belt 15 is attached/detached while the vehicle body 3 is raised to suspend the track frame 16. In this suspended state, too, application of a general tension on the crawler belt 15 is effected. This tension is adjusted after the travel device 2 comes into contact with the ground.

While the track frame 16 is in the suspended state, its center of gravity is positioned forwardly of the center between the front and rear driven wheels 12, 13, since the tension adjusting device 75 and guide wheel 65 are present in the forward portion. Thus, prior to application of the crawler tension (when there is no application of the tension) with the crawler belt 15 wound around the drive wheel 11, the front and rear driven wheels 12, 13 and the rollers 14, the track frame 16 assumes a forwardly tilted posture (a natural, front-down tilted posture as indicated by the solid lines in FIGS. 10 and 11) in which the front driven wheel 12 is positioned lower than the rear driven wheel 13.

From this posture, when the tension adjusting device 75 is operated to apply a tension to the crawler belt 15 with the front driven wheel 12 displaced forward from the track frame 16, the drive wheel 11 and front and rear driven wheels 12, 13 receive a relative constricting force from the crawler belt 15 so that an inward-acting force acts on each wheel.

Each force acts in various manners, including upward and downward, and forward and backward. In any case, the track frame 16 is swung up and down around the pivot shaft 22 by the front driven wheel 12 so that the forces acting on the three wheels reach a substantial equilibrium (reach a balanced state). The track frame 16 stops swinging when the total force acting on the three wheels is approximately zero. Although the front portion of the track frame 16 in that state assumes a lowered or raised tilted posture, this posture is forcibly altered to an substantially horizontal posture by coming into contact with the ground.

For example, let us assume that the pivot shaft 22 is positioned directly below the axis X of the drive wheel 11, the horizontal distance from the drive wheel 11 to the front driven wheel 12 and the horizontal distance from the drive wheel 11 to the rear driven wheel 13 are equal when in contact with the ground, and that the crawler belt in side view takes an isosceles triangle substantially. In this case, when the track frame 16 transitions from its natural, slight front-down tilted posture to its horizontal posture, the forces acting on the drive wheel and the front and rear driven wheels are combined directly below the axis of the drive wheel and the resultant force becomes substantially zero, thus resulting in a balanced state.

As shown in FIG. 11, let us assume next that the pivot shaft 22 is positioned directly below the axis X of the drive wheel 11, and that the horizontal distance from the drive wheel 11 to the front driven wheel 12 is set longer than the horizontal distance from the drive wheel 11 to the rear driven wheel 13 when in contact with the ground. Since the span from the drive wheel 11 to the front driven wheel 12 is longer in this case, application of tension produces a larger torque across this span than one produced across the span from the drive wheel 11 to the rear driven wheel 13. Thus, the track frame 16 in the slight front-down tilted posture changes takes a horizontal posture and finally to a forward-up posture (a slight rear-down tilted posture wherein the front portion is raised as indicated by a dot-and-dash line in FIG. 11), so that the resultant force becomes substantially zero.

Then, when the travel device 2 is put in contact with the ground in that slight rear-down tilted posture (as indicated by a two-dot-and a-dash line in FIG. 11), the track frame 16 forcibly becomes substantially horizontal to the ground. In this state, a front-raising force (prestress) is applied to the travel device 2.

This front-raising force works as a floating direction force on soft ground areas such as wet fields (paddy fields), to prevent the travel device 2 from sinking and facilitates for the travel device 2 to ride over obstacles such as stones and rocks.

As shown in the foregoing embodiment and in FIG. 10, even if the horizontal distance from the drive wheel 11 to the front driven wheel 12 is set longer than the horizontal distance from the drive wheel 11 to the rear driven wheel 13 when in contact with the ground, as the pivot shaft 22 is positioned (displaced) forward from the position directly below the axis X of the drive wheel 11, converse to the above description, the tension-derived forces cause a posture alteration so that the track frame 16 in the slight front-down tilted posture is further front-lowered (i.e. a front-down tilted posture in which the front portion is pushed down as shown by the dotted line in FIG. 10).

Then, when the travel device 2 is put in contact with the ground in that slight front-down tilted posture (indicated by a two-dot-and-a-dash line in FIG. 10), the track frame 16 forcibly becomes substantially horizontal to the ground, and thus a front-lowering force (prestress) is applied to the travel device 2.

On hard fields such as dry fields, this front-lowering force checks floating forces, increases a traction force of the travel device 2, and checks a jump-up of the same when colliding with an obstacle such as stones and rocks.

When the tension is applied, whether the track frame 16 is subjected to a front-up or a front-down is determined by the position of the pivot shaft 22. Depending on its position, no vertical movement of the track frame 16 is effected, even if the tension is applied to the track frame 16 without any tension. In this position, the forces applied to the drive wheel 11 and front and rear driven wheels 12, 13 reach an approximate equilibrium. The position lies at a point between directly below the drive shaft 26 and pivot shaft 22 shown in FIG. 10. This point refers to as a virtual swing point Z of the track frame 16.

When the pivot shaft 22 is positioned at the virtual swing point Z, the track frame 16 assumes a natural, slight forward tilting posture since its front portion is heavier. In this, the track frame 16 does not move substantially even if a tension is applied to the crawler belt 15, and when the travel device 2 is put in contact with the ground, the track frame 16 undergoes a posture alteration transitioning from its natural posture to a horizontal posture, which produces a slight thrusting-down force.

The virtual swing point Z may be set at a position in which the track frame 16 assumes a horizontal posture upon application of tension. Then, it is possible to achieve a condition similar to that when the crawler belt substantially forms an isosceles triangle in side view, with the pivot shaft 22 positioned at the swing point Z, and with no vertical prestress produced after the travel device 2 is put in contact with the ground. In this condition, however, neither a floating force nor a thrusting-down force is produced.

In order to produce the floating force at the front portion of the travel device 2, the pivot shaft 22 has only to be displaced backward from the swing point Z. Conversely, to produce the thrusting-down force, the pivot shaft 22 has only to be displaced forward from the swing point Z.

As described above, the floating force is produced at the front portion of the travel device 2 when the pivot shaft 22 is directly below the drive shaft 26. Displacing and positioning the pivot shaft 22 forward from the point directly below the drive shaft 26 changes the floating force or the thrusting-down force. This allows an alteration in order to achieve a function suitable to field conditions for e.g. maintaining a traction force on dry fields and obtaining the floating force on wet fields (paddy fields).

To displace the pivot shaft 22 fore and aft from the virtual swing point Z, or forward from the point directly below the drive shaft 26, a position of the pivot shaft suspension support member 53 relative to the drive wheel 11 and axle case 19 is adjusted fore and aft, and a position of the pivot shaft bearing member 54 relative to the track frame 16 is adjusted fore and aft, to thereby displace the pivot shaft 22 in the same direction relative to both the axle case 19 and track frame 16. During these operations, it is possible to remain unchanged a longitudinal positional relationship between the drive wheel 11 and the front and rear driven wheels 12, 13.

When only the position of the pivot shaft suspension support member 53 changes fore and aft relative to the axle case 19, to displace the pivot shaft 22 together with the track frame 16, the longitudinal positional relationship of the front and rear driven wheels 12, 13 changes fore and aft relative to the drive wheel 11. Since the position of the track frame 16 changes fore and aft relative to the drive wheel 11 in this case, the longitudinal position of the virtual swing point Z changes also. In consideration of this change, it is possible to set the floating force and the thrusting-down force.

On the other hand, when the pivot shaft suspension support member 53 unmoved relative to the axle case 19 with the pivot shaft 22 directly positioned below or forwardly of the drive shaft 26, it is possible to displace the virtual swing point Z fore and aft relative to the unmoved pivot shaft 22 by adjusting the position of the track frame 16 fore and aft relative to the pivot shaft bearing member 54. When the swing point Z is positioned forwardly of the pivot shaft 22, it is possible to produce the floating force at the front portion of the travel device 2. And, when the swing point Z is positioned rearward of the pivot shaft 22a, it is possible to produce the thrusting-down force at the front portion of the travel device 2.

In the above, if the pivot shaft 22 can be positioned directly below or forwardly of the drive shaft 26 and the rear portion of the travel device 2 can be substantially protrude rearward from the axle case 19, then it is possible to position the pivot shaft 22 rearward of the point directly below the drive shaft 26.

Longitudinal positional adjustment of the pivot shaft 22 relative to the drive wheel 11, and longitudinal positional adjustment of the track frame 16 relative to the pivot shaft 22 are not done frequently. However, these are useful, for example, when it is desired to alternately use a single semi-crawler tractor between wet field conditions in spring and dry field conditions in autumn, to obtain a semi-crawler unit optimized for various field conditions.

It should be noted that the present invention is not limited to the above-described embodiment and that various modifications are possible. For example, the present invention can be applied to four, independent semicrawler units instead of four, front/rear wheel units. And, the present invention can be applied to a riding-type, walk-behind and other control-types of machines.

It is also possible to offset the drive shaft 26 relative to the rear axle 25 fore and aft, or to mount the drive shaft 26 to the rear axle 25.

INDUSTRIAL APPLICABILITY

With a semicrawler-type working vehicle according to the present invention as described above, the force acting on the front wheels when tension is applied to the crawler belt is set optimal for agricultural and other works, to thereby provide functions optimized to various field conditions, such as securing a traction force in dry fields and a floating force in wet fields (paddy fields).

the invention claimed is:

1. A semicrawler-type working vehicle having a vehicle body, a front steering control wheel arranged at a front position of the vehicle body, a drive shaft and a pivot shaft arranged at rear positions of the vehicle body, and a semicrawler unit driven by the drive shaft, the semicrawler-type working vehicle comprising:

a track frame supporting the semicrawler unit relative to the vehicle body by means of the pivot shaft;

a drive wheel arranged on the drive shaft;

a front driven wheel and a rear driven wheel which are supported by the track frame such that a horizontal distance from the drive wheel to the front driven wheel is longer than a horizontal distance from the drive wheel to the rear driven wheel and such that the drive wheel is positioned between the front driven wheel and the rear driven wheel in a fore and aft direction of the vehicle body;

a crawler belt wound around the drive wheel, the front driven wheel, and the rear driven wheel; and a single axis defined by the pivot shaft, the track frame being pivotal about the single axis relative to the vehicle body;

wherein the pivot shaft is displaced forward from a vertical line that runs through a center of the drive wheel.

2. The semicrawler-type working vehicle according to claim 1, wherein the track frame is pivotably supported relative to the pivot shaft and a position of the track frame is adjustable in a longitudinal direction of the vehicle.

3. The semicrawler-type working vehicle according to claim 2, further comprising a pivot shaft bearing member for pivotably receiving the pivot shaft, the pivot shaft bearing member being adapted to adjust a position thereof in the longitudinal direction relative to the track frame.

4. The semicrawler-type working vehicle according to claim 1, wherein the pivot shaft is adapted to adjust a position thereof relative to the vehicle body in the longitudinal direction of the vehicle.

5. A semicrawler-type working vehicle having a vehicle body, a front steering control wheel arranged at a front position of the vehicle body, a drive shaft and a pivot shaft arranged at rear positions of the vehicle body, and a semicrawler unit driven by the drive shaft, the semicrawler-type working vehicle comprising:
  a track frame pivotably supporting the semicrawler unit relative to the vehicle body by means of the pivot shaft;
  a drive wheel arranged on the drive shaft;
  a front driven wheel and a rear driven wheel which are supported by the track frame such that a horizontal distance from the drive wheel to the front driven wheel is longer than a horizontal distance from the drive wheel to the rear driven wheel and such that the drive wheel is positioned between the front driven wheel and the rear driven wheel in a fore and aft direction of the vehicle body;
  a crawler belt wound around the drive wheel, the front driven wheel, and the rear driven wheel; and
  a guide wheel arranged on the track frame, to regulate a lateral displacement of the crawler belt between the drive wheel and the rear driven wheel, and between the drive wheel and the front driven wheel,
  wherein the pivot shaft is displaced forward from a vertical line that runs through a center of the drive wheel.

6. A semicrawler-type working vehicle having a vehicle body, a front steering control wheel arranged at a front position of the vehicle body, a drive shaft and a pivot shaft arranged at rear positions of the vehicle body, and a semicrawler unit driven by the drive shaft, the semicrawler-type working vehicle comprising:
  a track frame pivotably supporting the semicrawler unit relative to the vehicle body by means of the pivot shaft;
  a drive wheel arranged on the drive shaft;
  a front driven wheel and a rear driven wheel which are supported by the track frame such that a horizontal distance from the drive wheel to the front driven wheel is longer than a horizontal distance from the drive wheel to the rear driven wheel and such that the drive wheel is positioned between the front driven wheel and the rear driven wheel in a fore and aft direction of the vehicle body;
  a crawler belt wound around the drive wheel, the front driven wheel, and the rear driven wheel; and
  a plurality of rollers positioned between the front driven wheel and the drive wheel, and ground-contacting lugs of the crawler belt, a pitch between adjacent rollers is longer than a pitch of adjacent ground-contacting lugs by 1/N (where N is the number of the rollers),
  wherein the pivot shaft is displaced forward from a vertical line that runs through a center of the drive wheel.

7. A semicrawler-type working vehicle having a vehicle body, a front steering control wheel arranged at a front position of the vehicle body, a drive shaft and a pivot shaft arranged at rear positions of the vehicle body, and a semicrawler unit driven by the drive shaft, the semicrawler-type working vehicle comprising:
  a track frame pivotably supporting the semicrawler unit relative to the vehicle body by means of the pivot shaft;
  a drive wheel arranged on the drive shaft;
  a front driven wheel and a rear driven wheel which are supported by the track frame such that a horizontal distance from the drive wheel to the front driven wheel is longer than a horizontal distance from the drive wheel to the rear driven wheel and such that the drive wheel is positioned between the front driven wheel and the rear driven wheel in a fore and aft direction of the vehicle body;
  a crawler belt wound around the drive wheel, the front driven wheel, and the rear driven wheel; and
  a plurality of rollers positioned between the front driven wheel and the drive wheel, an outer perimeter each of the rollers is covered with rubber,
  wherein the pivot shaft is displaced forward from a vertical line that runs through a center of the drive wheel.

8. A semicrawler-type working vehicle having a vehicle body, a front steering control wheel arranged at a front position of the vehicle body, a drive shaft and a pivot shaft arranged at rear positions of the vehicle body, and a semicrawler unit driven by the drive shaft, the semicrawler-type working vehicle comprising:
  a track frame pivotably supporting the semicrawler unit relative to the vehicle body by means of the pivot shaft, wherein the pivot shaft includes two short shafts aligned on a same axis;
  a drive wheel arranged on the drive shaft;
  a front driven wheel and a rear driven wheel which are supported by the track frame such that a horizontal distance from the drive wheel to the front driven wheel is longer than a horizontal distance from the drive wheel to the rear driven wheel and such that the drive wheel is positioned between the front driven wheel and the rear driven wheel in a fore and aft direction of the vehicle body; and
  a crawler belt wound around the drive wheel, the front driven wheel, and the rear driven wheel,
  wherein the pivot shaft is displaced forward from a vertical line that runs through a center of the drive wheel.

9. The semicrawler-type working vehicle according to claim 1, further comprising a guide wheel arranged on the track frame, to regulate a lateral displacement of the crawler belt between the drive wheel and the rear driven wheel, and between the drive wheel and the front driven wheel.

10. The semicrawler-type working vehicle according to claim 1, further comprising a plurality of rollers positioned between the front driven wheel and the drive wheel, and ground-contacting lugs of the crawler belt, a pitch between adjacent rollers is longer than a pitch of adjacent ground-contacting lugs by 1/N (where N is the number of the rollers).

11. The semicrawler-type working vehicle according to claim 1, further comprising a plurality of rollers positioned between the front driven wheel and the drive wheel, an outer perimeter each of the rollers is covered with rubber.

12. The semicrawler-type working vehicle according to claim 1, wherein the pivot shaft includes two short shafts aligned on a same axis.

* * * * *